United States Patent [19]

Medlin, Jr.

[11] Patent Number: 4,753,361
[45] Date of Patent: Jun. 28, 1988

[54] SWITCH BOX MOUNTING BRACKET

[76] Inventor: Lewis B. Medlin, Jr., 186 Wildhurst Ave., Roanoke, Va. 24012

[21] Appl. No.: 18,909

[22] Filed: Feb. 25, 1987

[51] Int. Cl.⁴ .............................................. H02G 3/08
[52] U.S. Cl. ...................................... 220/3.6; 220/3.3; 220/3.5; 220/3.9; 248/27.1; 248/DIG. 6
[58] Field of Search ............. 248/27.1, DIG. 6, 205.1; 220/3.3, 3.5, 3.6, 3.9

[56] References Cited

U.S. PATENT DOCUMENTS

| | | | |
|---|---|---|---|
| 1,620,063 | 3/1927 | Bowers | 220/3.4 |
| 3,606,223 | 9/1971 | Havener | 248/DIG. 6 X |
| 4,447,030 | 5/1984 | Nattel | 248/27.1 |
| 4,483,453 | 11/1984 | Smolik | 248/DIG. 6 X |
| 4,497,416 | 2/1985 | Smolik | 248/DIG. 6 X |
| 4,533,060 | 8/1985 | Medlin | 220/3.3 X |
| 4,561,615 | 12/1985 | Medlin, Jr. | 248/27.1 |
| 4,569,458 | 2/1986 | Horsley | 248/27.1 X |
| 4,572,391 | 2/1986 | Medlin | 220/3.3 X |
| 4,603,789 | 8/1986 | Medlin, Sr. | 220/33 X |
| 4,645,089 | 2/1987 | Horsley | 220/27.1 X |

Primary Examiner—Ramon O. Ramirez
Attorney, Agent, or Firm—B. B. Olive

[57] ABSTRACT

An improved electrical switch box mounting bracket is formed of a single piece of sheet metal in an L-shape or T-shape with right-angled plate portions at one end, one of which plate portions is adapted to serve as a stiffening arm between the walls. At the opposite end another flat plate portion is adapted to be secured to either another bracket of the same type or of another type in piggyback fashion or to an extension plate in turn secured to a stud. A recessed plate portion between the ends of the bracket provides an opening which registers with and receives either a one ear or two ear type electrical switch box for mounting using bendable tabs forming part of the bracket. An alternative embodiment does not employ the stiffening arm.

20 Claims, 5 Drawing Sheets

SWITCH BOX MOUNTING BRACKET

TECHNICAL FIELD

The invention relates to a mounting bracket for positioning and securing an electrical switch box during the course of construction.

BACKGROUND ART

Figure 1:
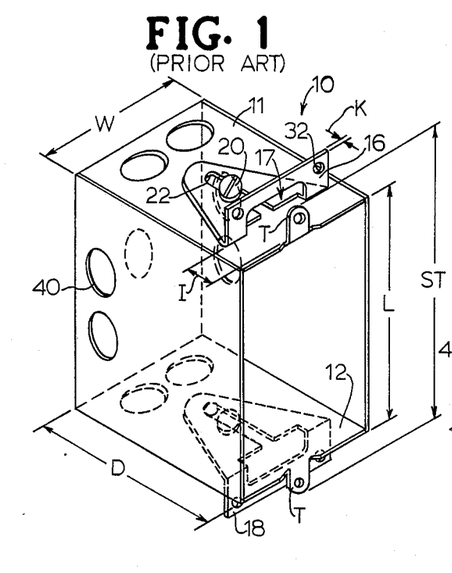
FIG. 1 is a perspective view of a prior art one screw ear electrical switch box.
Figure 2:
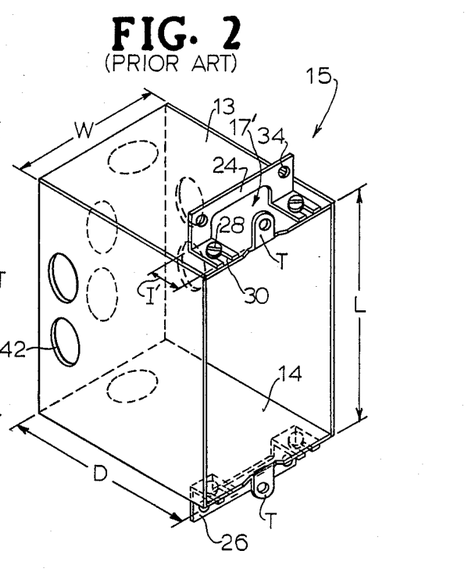
FIG. 2 is a perspective view of a prior art two screw ear switch box.
Figure 3:
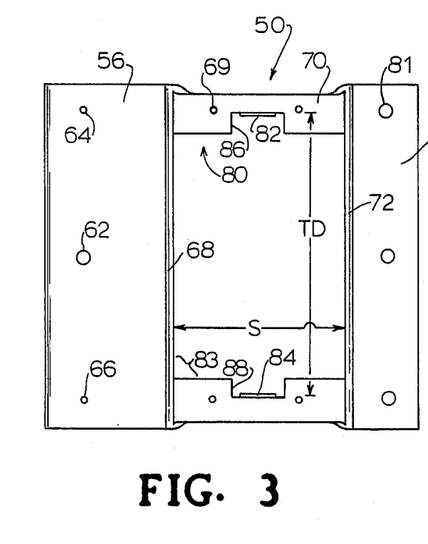
FIG. 3 is a front elevation view of the improved electrical switch box bracket of the invention according to the first embodiment.
Figure 4:
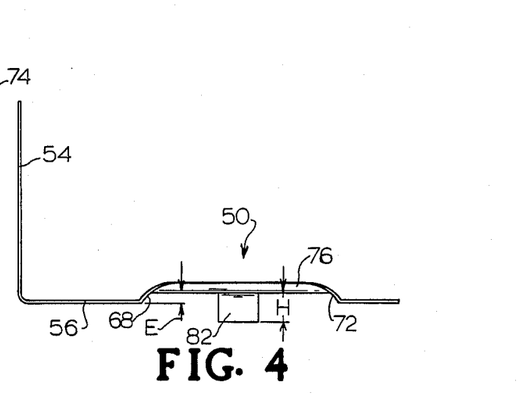
FIG. 4 is a top plan view of the invention bracket of FIG. 3.
Figure 5:
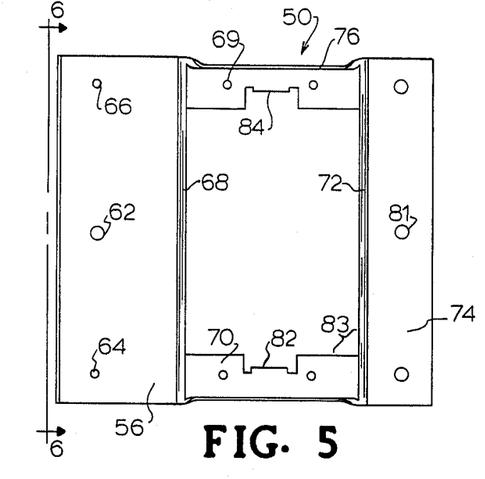
FIG. 5 is a rear elevation view of the invention bracket of FIG. 3.
Figure 6:
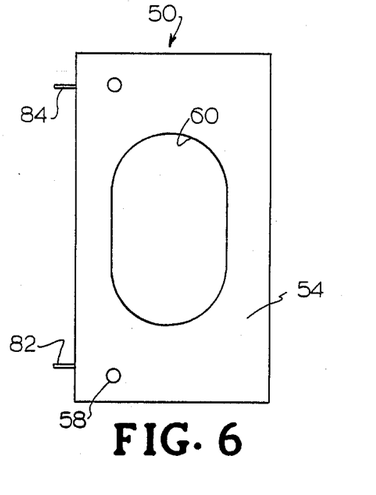
FIG. 6 is an end view of the invention bracket of FIG. 3 taken in the direction of line 6—6 of FIG. 5.

An electrical switch box typically has what is referred to as "ears" which are adjustably secured to the outer ends of the box and mount screw holes for fastening the box to other structure. The ears are secured by either one or two screws and are referred to as one screw ears as illustrated in FIG. 1 or two screw ears as illustrated in FIG. 2. Generally, one screw eared switch boxes are primarily designed for receiving either so-called Romex cable, i.e. plastic covered wire, or the so-called BX cable, a flexible metal sheathed cable. Two screw eared electrical switch boxes are generally designed for receiving and being secured to rigid pipe enclosing the wiring.

In applicant's prior U.S. Pat. No. 4,561,615 entitled "Bracket For Junction Box", a substantially improved electrical switch box is disclosed. However, while representing a substantial improvement with respect to mounting of one screw ear boxes, the bracket of the subject patent was not adapted to the two screw ear type switch boxes. Thus, there is a demand for a still further improved switch box mounting bracket adapted for positioning and securing either a one screw eared switch box or a two screw eared switch box.

Experience with the switch box mounting bracket of applicant's prior patent has also indicated a need for further improvement with regard to providing an electrical switch box bracket which can be mounted in any of several positions and which includes a stiffening leg for stiffening the overall bracket after installation. Additionally, it has been recognized that it would be advantageous to provide a further improved electrical switch box mounting bracket such that a pair of such brackets could be mounted on opposite sides of a metal stud to form a double mounting arrangement. Metal studs are currently being used in new building construction in large quantities. Thus even minor improvements in electrical switch boxes have important implications in the trade with respect to the mounting of such brackets on metal studs.

In another respect the conventional switch box mounting bracket has not adapted to being mounted in pairs, i.e., on the same side of the stud, attached together and forming a piggyback arrangement. Another need has been for an improved electrical switch box adapted to be associated with an extension plate enabling the bracket to be mounted at some location between the studs as distinct from being secured to one of the studs.

In U.S. Pat. No. 4,533,060 there is disclosed an improved mounting bracket for a square outlet box on which a dry wall ring is typically mounted. This patent recognizes the advantage of having offsets on the face of the bracket to minimize bulging after the typical sheet rock dry wall is secured to the studs and covers the mounting bracket except for that portion purposely left exposed for purposes of making connections. This patent also teaches the advantage of using a stiffening arm as part of the bracket for mounting of electrical outlet and junction boxes. However, because of different structural considerations, the advantage of using offsets and a stiffening arm has not been carried over into the construction of brackets for mounting electrical switch boxes as contrasted to mounting electrical outlet and junction boxes. Thus, the present invention has as one object providing an improved electrical switch box mounting bracket which in one embodiment provides both offsets on the surface of the bracket and a stiffening arm.

A further improved mounting bracket for electrical outlet boxes is disclosed in U.S. Pat. No. 4,572,391. This latter patent provides a bracket for mounting pairs of electrical outlet boxes and takes advantage of the offset arrangement and stiffening arm arrangement taught by the previously referred to U.S. Pat. No. 4,533,060. Additionally, U.S. Pat. No. 4,572,391 teaches an extension plate construction enabling the outlet box bracket to be mounted at some location between the studs rather than being secured to a selected stud. Additionally, U.S. Pat. No. 4,572,391 teaches an outlet box mounting bracket adapted to being mounted in pairs in a piggyback fashion. However, the provision of an electrical switchbox mounting bracket as contrasted to an outlet box mounting bracket adapted for use with an extension plate and for being mounted in pairs in piggy-back fashion has not appeared in the market prior to the present invention. Providing such a switch box mounting bracket is another object of the invention. The present invention also seeks to take advantage of providing in a switch box mounting bracket the offset features, the stiffening arm features and the extension bracket features as disclosed for an outlet box mounting bracket in U.S. Pat. No. 4,603,789 entitled "Extension Bracket for Mounting Electrical Outlet Box".

In another aspect of the prior art, U.S. Pat. No. 1,620,063 teaches a switch box mounting bracket utilizing a tab as a means of securing a switch box to a bracket. However, the bracket in such patent lacks a stiffening arm, offsets, the ability to piggyback, the ability to mount a pair of the brackets on opposite sides of the stud and the ability to extend the bracket to a location between the studs. Furthermore, the disclosed switch box mounting bracket was designed to be fastened to wood studding and would not be useful for the modern type of dry wall construction because of the bulging the bracket would cause.

DISCLOSURE OF THE INVENTION

In accordance with the present invention, applicant provides a single thin sheet metal formed electrical switch box mounting bracket primarily intended for mounting a standard electrical switch box of approximately two inches width, three inches length and a depth which may vary, but may be on the order of about two and one-half inches in depth. Such box has at the upper edge of each of two opposed side walls a centrally positioned, outwardly extending screw tab and on the outer surface of each end wall either a single screw ear or two screw ear held by either a single screw or a pair of screws on the end wall. One side of the box is open and both the end walls and sidewalls are provided with appropriate knock-outs for receiving either plastic covered wire, BX cable or rigid type wiring as previously mentioned. The invention bracket provides an opening for loosely receiving the switch box and has parallel offsets extending lengthwise and disposed on opposite sides of the opening. Bendable tabs are provided at opposite ends of the opening enabling either a one screw ear or two screw ear type electrical switch box to be secured to the bracket.

The invention bracket further includes in three of the illustrated four embodiments, a stiffening arm formed to span the space between the front and back walls between which the bracket is mounted. The stiffening arm provides an opening for receiving conduit, wire cable or the like. Apertures are provided in the stiffening arm enabling the stiffening arm to be directly secured to a stud when desired. Apertures are also provided on web sections of the bracket on opposite sides of the opening enabling the bracket to be secured to a front stud surface, to another bracket in a piggyback array or to an extension plate. Starter holes are provided on end surfaces of the bracket outside the opening and mate holes in the ears such that if one of the tabs breaks an alternative means of securing the switch box to the bracket is provided. A third embodiment does not employ the stiffening arm and is intended for use where the wall thickness is less than 2½ inches and in ceiling studding.

DESCRIPTION OF THE DRAWINGS

FIGS. 3–14 illustrate a first embodiment, FIGS. 16–19 a second embodiment, and FIGS. 20–23 a third embodiment.

BEST MODE FOR CARRYING OUT THE INVENTION

Referring initially to FIGS. 1 and 2 for background purposes, electrical switch boxes 10 and 15 are typical of two types of electrical switch boxes available on today's market. Both have a width W of approximately two inches, a length L of approximately three inches and a depth D which may vary, but may be on the order of approximately two and one-half inches. Both types are also characterized by having an outwardly extending screw tab T centrally positioned on the upper edge of opposite end walls, e.g., end walls 11 and 12 on switch box 10 and end walls 13 and 14 on switch box 15. The screw tabs T overlie openings 17, 17' formed in the ears and of substantially larger size than the tabs. Openings 17, 17', as later explained, are usefully employed to receive securing tabs. On the one screw ear switch box exemplified by switch box 10 there is located a pair of L-shaped screw ears 16 and 18 held by single screws 20. The respective one screw ears 16, 18 are adjustably mounted by means of the slots 22.

The other type two screw ear switch box 15 illustrated in FIG. 2 includes a pair of L-shaped screw ears 24, 26 held by pairs of screws 28 adjustably mounted in slots 30. Construction fastening holes 32 are provided in the respective single screw ears 16, 18 and construction fastening holes 34 are provided in the respective two screw ears 26, 24. The location of the respective construction holes 32, 34 is standardized with respect to location of such holes in relation to the switch box. The one screw ear type switch box 10 includes a plurality of knockouts 40 normally used for Romex, i.e., plastic covered wire, or BX cable, a flexible metal sheathed cable whereas the two screw eared switch box 15 utilizes the knockouts 42 primarily for rigid pipe wiring. With the foregoing description in mind the description next proceeds to the invention bracket adapted to mount either the one screw ear type switch box 10 or the two screw ear type switch box 15.

Figure 15:
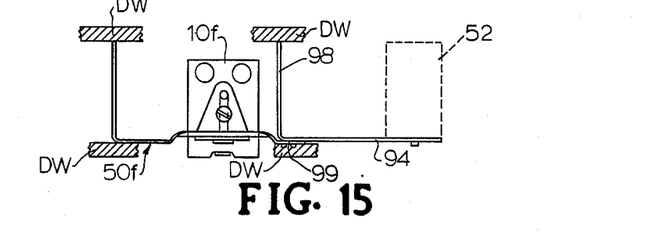
FIG. 15 is a top plan view of the FIG. 4 invention bracket secured to the extension plate of FIG. 13 between two partially illustrated walls.

Referring next to FIGS. 3 through 6, there is illustrated an improved electrical switch box mounting bracket 50 according to a first embodiment of the invention. Bracket 50 is primarily intended for mounting either a one screw ear type electrical switch box or a two screw ear type electrical switch box. The bracket is preferably formed of a small single section of sheet-metal and is adapted to fit snugly against a front surface or against both side and front surfaces of a metal stud 52 (FIG. 7) and be secured thereto as later referred to in connection with FIGS. 7 through 10. Bracket 50 assumes an L shape and comprises a flat arm 54 and at a right angle thereto a laterally extending flat web 56 which is an integral extension of arm 54. Arm 54 is provided with a pair of stud mounting holes 58 and also with a somewhat eliptical shaped opening 60 for receiving electrical cable, conduit pipe or the like associated with a particular switch box mounted on bracket 50. Web 56 is provided with a single stud mounting hole 62 and a pair of small screw starting holes 64, 66. As will be appreciated from later descriptions holes 62, 64 and 66 not only provide a means for securing bracket 50 to stud 52 but also for securing bracket 50 to another bracket of similar construction in a piggyback fashion as in FIG. 12, to another outlet box mounting bracket such as described in U.S. Pat. No. 4,572,391 and as illustrated in FIG. 13 or to an extension plate as illustrated in FIG. 15. Thus, the invention bracket not only provides a specifically improved electrical switch box mounting bracket but also a bracket forming part of an overall improved mounting system for both electrical switch boxes as well as electrical outlet or junction boxes.

The referred to flat web 56 is bounded by offset 68 and continues to extend laterally outward from arm 54 as flat-mounting member 70 bounded on its outer end by offset 72 from which extends laterally the flat end or web member 74 in the same plane as member 56. The lateral spacing S of the offsets 68, 72 corresponds to the width of the bracket opening 80 and the depth E of the offsets corresponds generally to the thickness K (FIG. 1) of the ears. Thus, dry wall sheets DW (FIG. 8) can lie flat against the surfaces of webs 56 and 74. An inwardly-turned, right-angled, strengthening flange 76 is provided on each of the outer end edges of the flat-mounting member 70. The laterally-extending mounting member 70 is provided with a rectangular shaped cut out or opening 80 with four square corners 83 and which is just slightly larger than the exterior dimensions W and L of the switch box 10 or 15. Flat end member 74 includes three holes 81 useful for securing bracket 50 to a stud 52 (FIG. 8), in the piggyback relation of FIG. 12 or in the extension plate configuration as illustrated in FIG. 15. A pair of tabs 82, 84 are formed from the material in notches 86, 88 (FIG. 3) and prior to use as later explained extend perpendicular to the plane of the flat mounting member 70.

Figure 7:
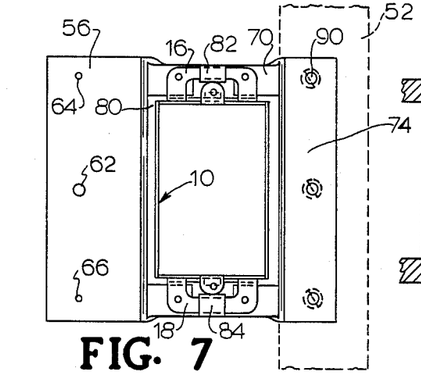
FIG. 7 is a front elevation view of the invention bracket of FIG. 3 with the bracket mounting a prior art single ear electrical switch box.
Figure 8:
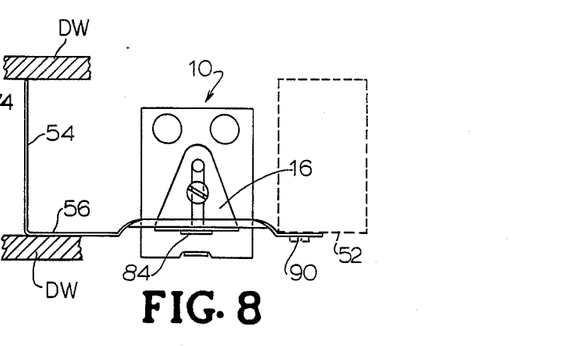
FIG. 8 is a top plan view of the invention bracket of FIG. 7 mounted between two partially illustrated walls.

In one mode of use the invention bracket 50 is secured to a stud 52 by means of screws 90 and the one screw ear switch box 10 is inserted in the opening 80 as in FIG. 7 after which the respective tabs 82, 84 received by openings 17 are bent outwardly as in FIG. 8 so as to secure switch box 10 to the flat mounting member 70 and thus to bracket 50 and with outer surfaces of the ears 16, 18 and webs 56 and 74 all residing in substantially the same plane. The height H (FIG. 4) of the tabs 82, 84 is preferably less than the distance I (FIG. 1) between the threaded tab T and the top surface of the one screw ear 16 (FIG. 1) or the distance I' between the tab T and the top surface of the two screw ear 24 (FIG. 2). Additionally, it has been found desirable to form the respective tabs 82, 84 such that the distance TD (FIG. 3) between the tabs is substantially equal to the distance ST (FIG. 1) representing the distance between the outer surfaces of a pair of the screw tabs T on either the one screw ear switch box 10 or the two screw ear switch box 15. In the event either or both of the tabs 82, 84 malfunction or break the small screw starter holes 69 may be employed to secure the flat mounting member 70 to the respective one screw ear, e.g., one screw ear 18, or the respective two screw ear, e.g., two screw ear 24.

Figure 9:
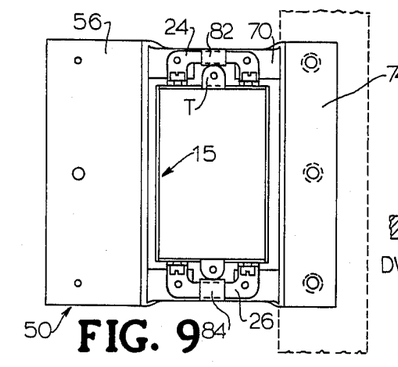
FIG. 9 is a front elevation view of the invention bracket of FIG. 3 with the bracket mounting a prior art double ear electrical switch box.
Figure 10:
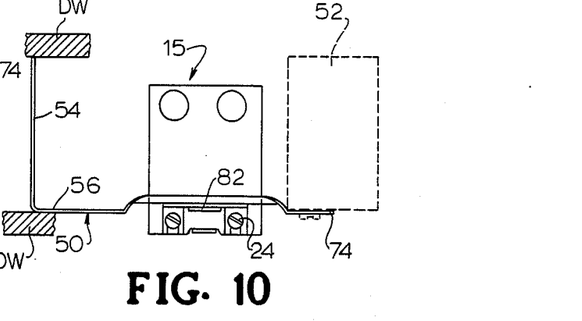
FIG. 10 is a top plan view of the invention bracket of FIG. 9 mounted between two partially illustrated walls.
Figure 11:
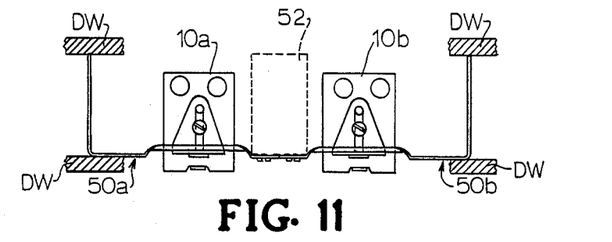
FIG. 11 is a top plan view of a pair of the FIG. 4 invention brackets shown in abutting relation secured to a common stud and mounted between two partially illustrated walls and illustrated supporting a pair of electrical switch boxes.

Among the several advantages of the invention bracket 50 is the fact that the invention bracket can be used to mount either a single ear electrical switch box 10 as illustrated in FIGS. 7 and 8 or a double ear electrical switch box 15 as illustrated in FIGS. 9 and 10. Additionally, the improved electrical switch box mounting bracket 50 is uniquely suited to being mounted in pairs on opposite sides of a single stud 52 as illustrated by the improved brackets 50a and 50b shown mounting a pair of single ear switch boxes 10a, 10b in FIG. 11.

Figure 12:
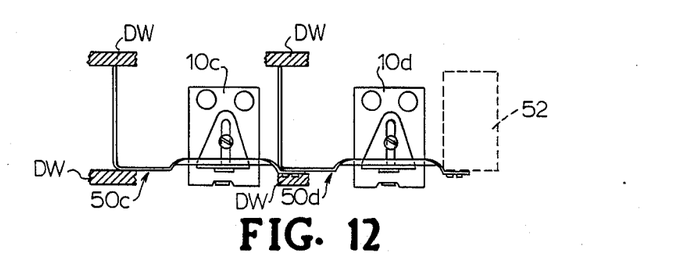
FIG. 12 is a top plan view, in reduced size, of a pair of the FIG. 4 invention brackets secured to a single stud and mounted in a piggyback array between two partially illustrated walls.
Figure 13:
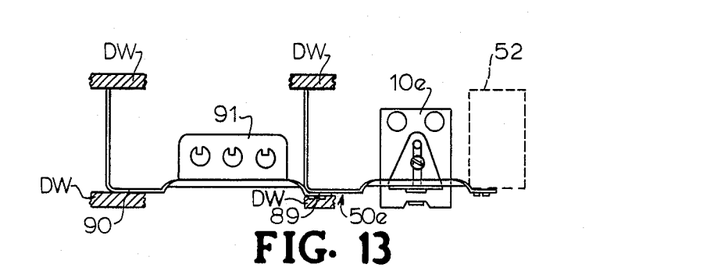
FIG. 13 is a top plan view of the FIG. 4 bracket supporting a single ear switch box in piggyback relation with a bracket of the type referred to in U.S. Pat. No. 4,572,391 mounting an outlet box.

In a further example of the versatility of the improved bracket 50 of the invention there is illustrated in FIG. 12 a piggyback arrangement in which one improved invention bracket 50c mounting a single ear switch box 10C is secured to another improved invention bracket 50d mounting a single ear switch box 10d in a piggyback configuration and secured to stud 52. Exemplifying the further advantage of the improved invention bracket 50 in its contribution to an overall improved mounting system for both electrical switch boxes as well as electrical outlet boxes, there is illustrated in FIG. 13 an improved invention bracket 50e mounting a single ear switch box 10e, secured to stud 52 and attached by screws 89 to an outlet box mounting bracket 90 mounting an outlet box 91 such as illustrated for example in FIGS. 24 and 25 of U.S. Pat. No. 4,572,391.

Figure 14:
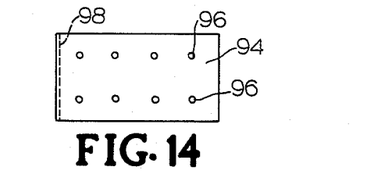
FIG. 14 is an elevation view of an extension plate used with the invention bracket of FIG. 3.

As a further and final example of overall versatility of the improved bracket 50 there is illustrated in FIG. 14 an extension plate 94 formed of a single sheet of rigid thin sheet metal having a plurality of uniformly spaced pairs of holes 96 and a stiffening arm 98. In FIG. 15, extension plate 94 is shown secured to stud 52 and mounting in piggyback fashion an invention switch box bracket 50f secured to extension plate 94 by screws 99 and supporting a single ear switch box 10f. The distance bracket 50f is positioned away from stud 52 is of course determined by which pair of holes 96 on extension plate 94 are selected for securing extension plate 94 to stud 52.

For use in applications where the wall thickness is less than 2½ inches as, for example, when 1⅜ inch thick metal studs are employed or in ceiling studing where a stabilizer would be inappropriate, the invention provides a second embodiment bracket 150 illustrated in FIGS. 16–19.

Referring next to FIGS. 16 through 19, there is illustrated an improved electrical switch box mounting bracket 150 according to a second embodiment of the invention. Bracket 150, as with the first embodiment, is primarily intended for mounting either a one screw ear type electrical switch box or a two screw ear type electrical switch box. Bracket 150, as with bracket 50 previously described, is preferably formed of a small single section of sheet metal and is adapted to fit snugly against a front surface of previously referred to metal stud 52 and be secured thereto as previously described. Bracket 150 assumes a substantially flat shape and comprises a laterally extending flat web 156. Web 156 is provided with a single stud mounting hole 162 and a pair of small screw starting holes 164, 166. As will be appreciated from prior descriptions, holes 162, 164 and 166 not only provide a means for securing bracket 150 to stud 52 but also for securing bracket 150 to another bracket of similar construction in a piggyback fashion as in FIG. 12, to another outlet box mounting bracket such as described in U.S. Pat. No. 4,572,391 and as illustrated in FIG. 13 or to an extension plate as illustrated in FIG. 15 in the manner previously described. Thus, the second embodiment invention bracket 150, as with the first embodiment bracket 50, not only provides a specifically improved electrical switch box mounting bracket but also a bracket forming part of an overall improved mounting system for both electrical switch boxes as well as electrical outlet or junction boxes.

The referred to flat web 156 is bounded by offset 168 and continues to extend laterally outward as flat-mounting member 170 bounded on its outer end by offset 172 from which extends laterally the flat end or web member 174 in the same plane as member 156. The lateral spacing S of the offsets 168, 172 corresponds, as in the first embodiment, to the width of the bracket opening 180 and the depth E of the offsets corresponds generally to the thickness K (FIG. 1) of the ears. Thus, dry wall sheets DW, as with the first embodiment, can lie flat against the surfaces of webs 156 and 174. An inwardly-turned, right-angled, strengthening flange 176 is provided on each of the outer end edges of the flat-mounting member 170. The laterally-extending mounting member 170 is provided with a rectangular-shaped, cut-out or opening 180 with four square corners 183 and which is just slightly larger than the exterior dimension W and L of the switch box 10 or 15. Flat end member 174 includes three holes 181 useful for securing bracket 150 to a stud 52, in the piggyback relation of FIG. 12 or in the extension plate configuration as illustrated in FIG. 15 as previously explained with regard to the first embodiment. A pair of tabs 182, 184 are formed from the material in notches 186, 188 (FIG. 16) and prior to use as later explained extend perpendicular to the plane of the flat mounting member 170. Bracket 150 of the second embodiment is otherwise used as previously explained. In the event either or both of the tabs 182, 184 malfunction or break, the small screw starter holes 169 may be employed to secure the flat mounting member 170 to the respective one screw ear, e.g., one screw ear 18, or the respective two screw ear, e.g., two screw ear 24, as previously explained.

A third embodiment illustrated in FIGS. 20-23 is intended to illustrate a modified bracket 250 incorporating a stabilizing arm as in the first embodiment bracket 50 but with minimum use of material.

Referring next to FIGS. 20 through 23, there is illustrated an improved electrical switch box mounting bracket 250 according to a third embodiment of the invention. Bracket 250, as with the first and second embodiments, is primarily intended for mounting either a one screw ear type electrical switch box or a two screw ear type electrical switch box. Bracket 250, as with brackets 50 and 150, is preferably formed of a small single section of sheet metal and is adapted to fit snugly against a front surface or against both side and front surfaces of the previously referred to metal stud 52 and be secured thereto as previously described in connection with FIGS. 7-10. Bracket 250 assumes a T shape and comprises a flat arm 254 formed from the material used to form opening 280 and at a right angle thereto a laterally extending flat web 256 which is an integral extension of arm 254. Arm 254 is provided with bendable legs 258 (FIG. 23) with a circular shaped opening 260 for receiving electrical cable, conduit pipe, or the like, associated with a particular switch box mounted on bracket 250. Web 256 is provided with three small screw starting holes 262, 264, 266. As will be appreciated from prior description, holes 262, 264 and 266 not only provide a means for securing bracket 250 to stud 52 but also for securing bracket 250 to another bracket of similar construction in a piggyback fashion as in FIG. 12, to another outlet box mounting bracket such as described in U.S. Pat. No. 4,572,391 and as illustrated in FIG. 13 or to an extension plate as illustrated in FIG. 15, all as previously explained in reference to the first and second embodiments. Thus, the invention bracket 250, as with the first and second embodiment brackets 50 and 150, not only provides a specifically improved electrical switch box mounting bracket but also a bracket forming part of an overall improved mounting system for both electrical switch boxes as well as electrical outlet or junction boxes.

The referred to flat web 256 is bounded by edge 268 and continues to extend laterally outward from arm 254 as flat-mounting member 270 bounded on its outer end by edge 272 outwardly from offsets 271 and from which extends laterally the flat end or web member 274 offset from the plane of member 256. The lateral spacing S' (FIG. 20) of the edges 268, 272 corresponds to the width of the bracket opening 280 and to length SA of stabilizing arm 254 and the depth E' (FIG. 21) of the offset 271 corresponds generally to the thickness K (FIG. 1) of the ears. Thus, dry wall sheets DW can lie substantially flat against the surfaces of webs 256 and 274. An inwardly-turned, right-angled, strengthening flange 276 is provided on each of the outer end edges of the flat-mounting member 270. The laterally-extending mounting member 270 is provided with a rectangular-shaped, cut-out or opening 280 with four square corners 283 and which, unlike the first and second embodiment brackets 50, 150, is substantially larger than the exterior dimension W and L of the switch box 10 or 15. Flat end member 274 includes three holes 281 useful for securing bracket 250 to a stud 52, in the piggyback relation of FIG. 12 or in the extension plate configuration as illustrated in FIG. 15. A pair of tabs 282, 284 are formed from the material in notches 286, 288 (FIG. 20) and prior to use as later explained extend perpendicular to the plane of the flat mounting member 270. Other aspects of construction follow that previously explained. In the event either or both of the tabs 282, 284 malfunction or break, the small screw starter holes 269 may be employed to secure the flat mounting member 270 to the respective one screw ear, e.g., one screw ear 18, or the respective two screw ear, e.g., two screw ear 24, as previously explained.

Figures 16, 17, 24:
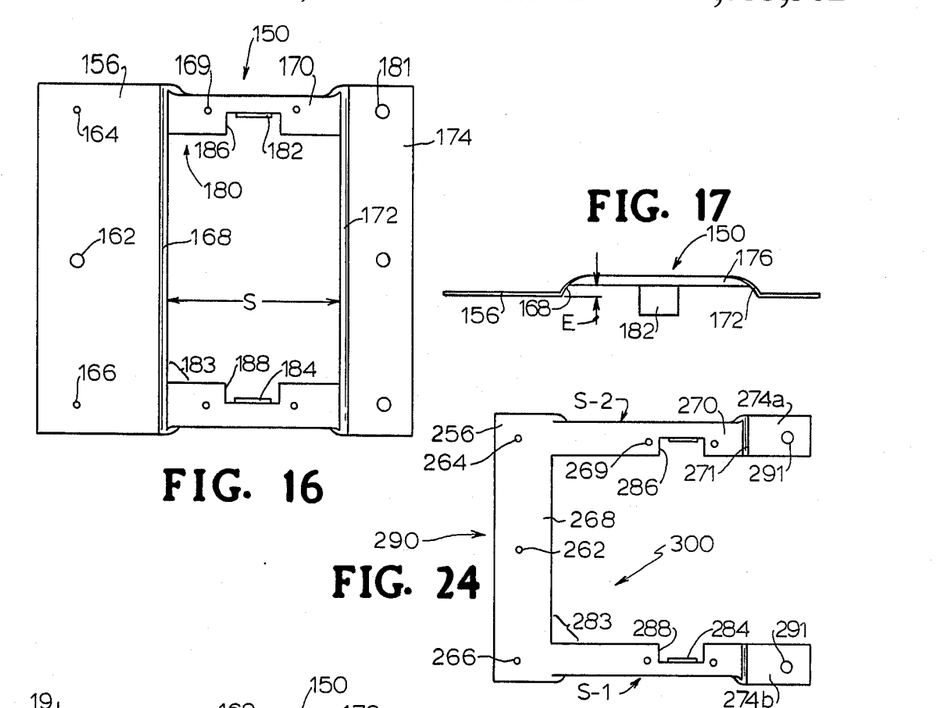
FIG. 16 is a front elevation view of the improved electrical switch box bracket of the invention according to a second embodiment.
FIG. 17 is a top plan view of the invention bracket of FIG. 16.
FIG. 24 is a front elevation view of a modification of the FIG. 20 bracket representing a fourth embodiment.
Figure 18:
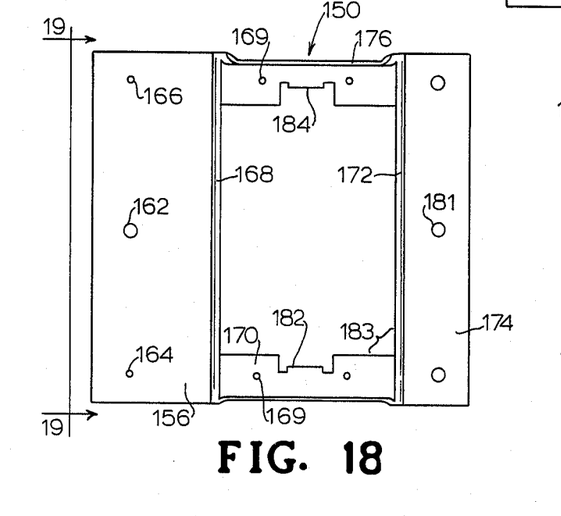
FIG. 18 is a rear elevation view of the invention bracket of FIG. 16.
Figure 19:
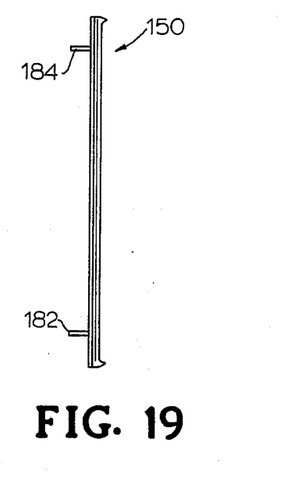
FIG. 19 is an end view of the invention bracket of FIG. 16 taken in the direction of line 19—19 of FIG. 18.
Figure 20:
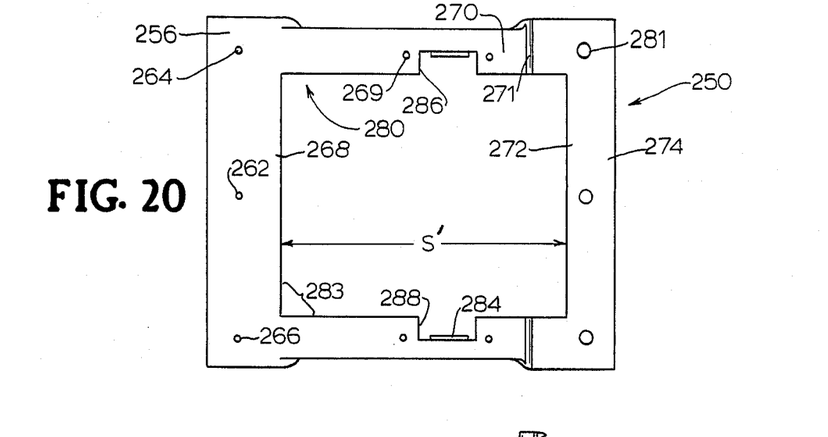
FIG. 20 is a front elevation view of the improved electrical switch box bracket of the invention according to a third embodiment.
Figure 21:
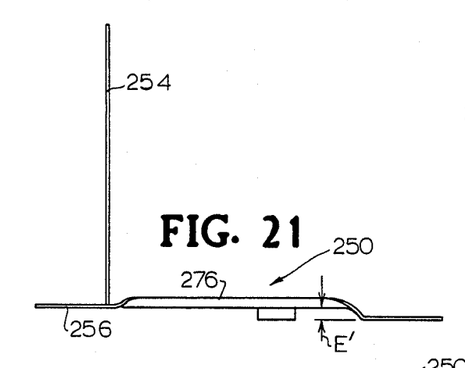
FIG. 21 is a top plan view of the invention bracket of FIG. 20.
Figure 22:
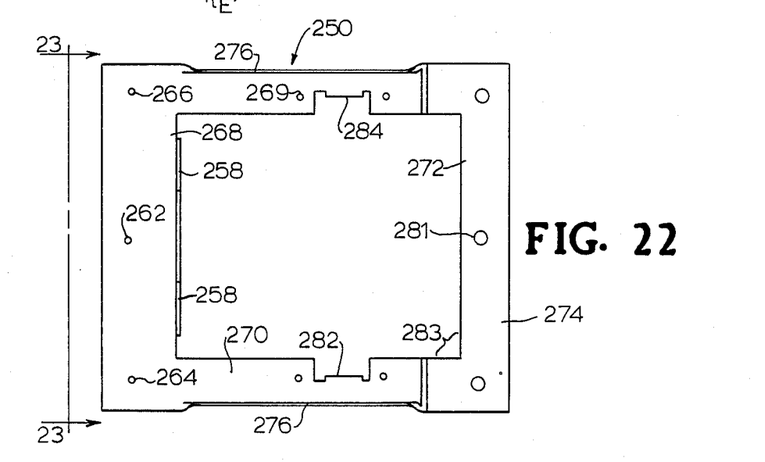
FIG. 22 is a rear elevation view of the invention bracket of FIG. 20.
Figure 23:
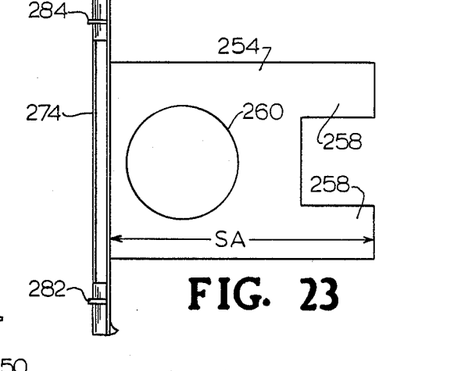
FIG. 23 is an end view of the invention bracket of FIG. 20 taken in the direction of line 23—23 of FIG. 22.

In a fourth embodiment bracket 290 illustrated in FIG. 24; the bracket of FIG. 20 is modified so as to provide a pair of spaced apart end plate portions designated 274a, 274b forming extensions of the bracket sides S-1, S-2. End plate portions 274a, 274b each have at least one bracke stud securing opening 291. The opening 300 in this embodiment is of course bounded on only three sides as illustrated. The numerals used in FIG. 20 have been repeated in FIG. 24 when referring to the same elements.

In summary, the following job proven and practical advantages are achieved by the present improved electrical switch box mounting bracket:

1. The same electrical switch box mounting bracket can be employed for mounting either a one screw ear switch box or a two screw ear switch box.

2. The improved electrical switch box mounting bracket adapts to having a pair of such brackets mounted on a single stud on opposite sides of the stud.

3. With one improved invention bracket secured to the stud another improved invention bracket can be secured to the first in a piggyback fashion with both brackets stiffened for adequate support.

4. While primarily intended to be used for mounting electrical switch boxes, the improved invention bracket also adapts to being mounted in piggyback fashion with another bracket formed for mounting an outlet box such that an electrical switch box and an outlet box can be mounted side by side with both having a stiffened support and attached to a common stud.

5. Where it is desired to locate either a single ear electrical switch box or a double ear electrical switch box at some location offset from the stud, the improved invention bracket adapts to being attached to an extension plate to allow such offset location.

6. While not illustrated other combinations are readily available for the first time in the history of the trade such as for example mounting an electrical switch box on one side of a stud using the improved bracket of the present invention together with a bracket mounting an outlet box on the opposite side of the stud of the type taught in U.S. Pat. No. 4,572,391.

7. In all examples preserving the advantage of having parallel offsets on both sides of the mounted electrical switch box so as to minimize bulging of the finished dry wall as used in the typical construction.

8. Ease of wiring or running of rigid conduit to the switch box is facilitated by incorporating an oval hole in the stiffening arm.

9. Where was thickness is less than 2½ inches or for ceiling studing the invention bracket remains useful without requiring the stabilizer and in appropriate circumstances enabling the switch box itself to be the stabilizer.

I claim:

1. An electrical switch box mounting assembly adapted for use with dry wall construction, comprising:
    (a) a rectangular electrical switch box having integrally joined flat base, side and end walls forming an interior chamber accessible through an opening opposite said base wall defined by outer edges of said side and end walls, a selected number and size of knock out discs on said walls, a fixedly positioned centrally located threaded screw receiving tab extending outwardly at a right angle from the outer edge of each said end wall to provide a pair of said threaded tabs substantially in the plane of said opening;
    (b) a pair of L-shaped screw ears having slots receiving screw means and adjustably secured by said screw means to opposite outer surfaces of said end walls, each of said screw ears having a fastening portion extending outwardly at a right angle parallel to and below the threaded tab on the end wall on which each such ear is mounted, said fastening portion having a pair of securing holes on opposite sides of a central opening formed therein and being substantially larger than the size of said threaded tab; and
    (c) an L-shaped mounting bracket formed of a single unitary piece of stiff sheet metal material, including:
        (i) first and second contiguous rectangular plate portions in right angular relation at a first end of said bracket, said first plate portion being sufficiently wide to substantially equal the width of the interior space of the wall on which said bracket is installed and adapted to engage an opposing wall surface during use to thereby serve as a stiffening member for said bracket; and
        (ii) a plate body portion extending outwardly from said second plate portion having:
            (aa) at an outer end a third rectangular flat plate end portion in the same plane as the plane of said second plate portion, said third plate end portion being adapted for securement to a mating surface forming part of a stud, bracket or extension plate and having a plurality of holes formed therein for receiving mating fasteners to effect said securement;
            (bb) between said third plate portion and second plate portion having a fourth rectangular plate portion in a plate offset from and substantially parallel to the plane of said second and third plate portions by an amount substantially equal to the thickness of said screw ear fastening portion, the width of said fourth plate portion plane being established by parallel offsets formed on both sides of said fourth plate portion and the length of said fourth plate portion being substantially equal to the length of said switch box;
            (cc) a substantially rectangular opening in said fourth plate portion defined by inwardly located opposed straight parallel upper and lower edges and opposed straight parallel right and left side edges located inwardly of said offsets and right-angled corner edges formed in said fourth plate portion around said rectangular opening, said rectangular tangular opening being sized to register with and loosely receive said box with said screw ear fastening portions resting between said offsets on mating portions of said fourth rectangular plate portion; and
            (dd) an outwardly extending bendable tab formed out of said sheet material comprising and located on each of opposite edges of said fourth plate portion opening, each said bendable tab extending outwardly perpendicular to the plane of said fourth plate portion and being adapted to be received by a respective said fastening portion central opening of a respective said ear and to be bent over said fastening portion parallel to and clear of a respective said threaded tab to secure said box to said bracket.

2. An electrical switch box mounting assembly as claimed in claim 1 including:
    (a) a rectangular extension plate formed of a single piece of flat stiff sheet metal material with a stiffening arm at one end in right angular relation and sufficiently wide to substantially equal the width of the interior space of the wall on which said bracket is installed and having a plurality of sets of pairs of holes spaced lengthwise thereof and adapted for receiving fasteners to secure an opposite end of said plate to the front surface of a stud utilizing one selected pair of said holes to establish the distance by which said bracket is offset from said stud and to secure said one end to said bracket third plate portion utilizing another selected pair of said holes in said plate mating a pair of holes in said bracket third plate portion, and (b) fasteners for effecting said securements, whereby when a said bracket has the third plate portion thereof secured to said one end of said extension plate and the opposite end of the extension plate is in turn secured to the front surface of a construction stud and said fasteners are installed to perfect the securement and an electrical switch box is positioned within said rectangular opening and said bendable tabs are bent over said screw ear fastening portions to perfect said securement, said first plate portion tends to stiffen said bracket, said stiffening arm tends to stiffen said plate and the outer surface of said screw ear fastening portions are maintained in substantially the same plane as the outer surface of said second and third plate portions of said bracket.

3. An electrical switch box mounting assembly as claimed in claim 1 including:
   (a) a second said bracket of the same construction as said first said bracket with the third plate portion of one said bracket secured to the second plate portion of the other said bracket in a piggyback configuration; and
   (b) a second said switch box with a second said pair of said L-shaped screw ears mounted on said second bracket by means of the bendable tabs thereof being bent over the respective fastening portions of said second bracket screw ears.

4. An electrical switch box mounting assembly as claimed in claim 1 including:
   (a) a second outlet box bracket having a mating plate portion secured to the second plate portion of said switch box bracket in a piggyback configuration; and
   (b) an outlet box mounted in said outlet box bracket adjacent the said switch box mounted in said switch box bracket.

5. An electrical switch box mounting assembly adapted for use in dry wall construction for a switch box having adjustable screw ear fasteners with central openings and fixed threaded tabs on the end walls thereof, comprising:
   (a) a mounting bracket formed from a single unitary section of stiff sheet metal material including:
      (i) a flat plate body portion having at least one substantially rectangular opening defined by inwardly located opposed straight parallel upper and lower edges and opposed straight parallel right and left side edges located inwardly of said flat plate body portion and right-angled corner edges formed in said flat plate body portion around said rectangular opening, said rectangular opening being sized to register with and loosely receive a switch box with its screw ear fasteners resting on mating end portions of said flat body portion;
      (ii) at least one outwardly extending bendable tab formed out of said sheet material comprising and located on at least one of opposite edges of said flat plate body portion opening, each said bendable tab extending outwardly perpendicular to the plane of said flat plate body portion opening and being adapted to be received by a respective central opening of a respective said screw ear fastener and to be bent over said screw ear fastener parallel to and clear of a respective threaded tab of said switch box to secure said switch box to said bracket;
      (iii) plural spaced bracket mounting openings formed through at least one end plate portion forming an extension of said flat plate body portion enabling said mounting bracket to be attached to a wall stud by means of fasteners placed through said bracket mounting openings; and
      (iv) wherein said flat plate and end plate portions reside in offset parallel planes separated by at least one defined offset formed in said bracket between said flat plate and end plate portions, the depth of said offset being substantially equal to the thickness of said screw ear fastener.

6. An electrical switch box mounting assembly as claimed in claim 5 wherein said flat plate and end plate portions reside in offset parallel planes separated by defined offsets formed in said bracket between said flat plate and end plate portions.

7. An electrical switch box mounting assembly as claimed in claim 5 including at least one right angular stabilizing plate extension disposed on at least one side of said end plate portion and extending outwardly therefrom, said plate extension terminating with at least one section of reduced width forming at least one leg portion having an outermost edge adapted to engage an opposing wall surface during use and being bendable enabling the size of said plate extension to be reduced.

8. An electrical switch box mounting assembly as claimed in claim 5 including at least one right angular stabilizing rectangular plate extension formed from sheet material removed to establish said rectangular opening and extending outwardly therefrom with an outermost edge of said plate extension being adapted to engage an opposing wall surface during use.

9. An electrical switch box mounting assembly as claimed in claim 5 including at least one rectangular extension plate formed of a single piece of flat stiff sheet material and having a plurality of sets of pairs of holes spaced lengthwise thereof and adapted for receiving fasteners to secure one end of said plate to the front surface of a stud utilizing one selected pair of said holes to establish the distance by which said bracket is offset from said stud and to secure an opposite end of said plate to said bracket end plate portion utilizing another selected pair of said holes in said extension plate mating a pair of holes in said bracket end plate portion and fasteners for effecting said securements, whereby when said bracket has at least one end plate portion thereof secured to one end plate portion of said extension plate and the opposite end of said extension plate is in turn secured to the front surface of a construction stud and said fasteners are installed and an electrical switch box is positioned within said rectangular opening, said bendable tabs are bent over said screw ear fastening portion to perfect said securement.

10. An electrical switch box mounting assembly adapted for dry wall construction for a switch box having adjustable screw ear fasteners with central openings and fixed threaded tabs on the end walls thereof comprising:
   (a) a mounting bracket formed from a single unitary section of stiff sheet metal material including:
      (i) a flat plate body portion having at least one substantially rectangular opening defined by inwardly located opposed straight parallel upper and lower edges and opposed straight parallel right and left side edges located inwardly of said flat plate body portion and right-angled corner edges formed in said flat plate body portion around said rectangular opening, said rectangular opening being sized to register with and loosely receive a switch box with its screw ear fasteners resting on mating portions of said flat plate body portion;

(ii) at least one outwardly extending bendable tab formed out of said sheet material comprising and located on at least one of opposite edges of said flat plate body portion opening, each said bendable tab extending outwardly perpendicular to the plane of said flat plate body portion opening and being adapted to be received by a respective central opening of a respective said screw ear fastener and to be bent over said screw ear fastener parallel to and clear of a respective threaded tab of said switch box to secure the switch box to said bracket;

(iii) at least one right angular stabilizing rectangular plate extension disposed on at least one side of said end plate portion and extending outwardly therefrom, said plate extension terminating with at least one section of reduced width forming at least one leg portion having an outermost edge adapted to engage an opposing wall surface during use and being bendable enabling the size of said plate extension to be reduced; and (iv) plural spaced bracket mounting openings formed through at least one end plate portion forming an extension of said flat plate body portion enabling said mounting bracket to be attached to a wall stud by means of fasteners placed through said bracket mounting openings. enabling said mounting bracket to be attached to a wall stud by means of fasteners placed through said bracket mounting openings.

11. An electrical switch box mounting assembly as claimed in claim 10 wherein said flat plate and end plate portions reside in offset parallel planes separated by at least one defined offset formed in said bracket between said flat plate and end plate portions.

12. An electrical switch box mounting assembly as claimed in claim 10 including:

(a) at least one rectangular extension plate formed of a single unitary piece of flat stiff sheet metal material with a stiffening arm on at least one side of said end plate portion in right angular relation and sufficiently wide to substantially equal the width of the interior space of a wall on which said bracket is installed and adapted as engage an opposing wall surface during use and having a plurality of sets of pairs of holes spaced lengthwise thereof and adapted for receiving fasteners to secure one end of said plate portion to the front surface of a stud utilizing one selected pair of said holes to establish the distance by which said bracket is offset from said stud and to secure an opposite end of said plate to said bracket end plate portion utilizing another selected pair of said holes in said extension plate mating a pair of holes in said bracket end plate portion; and (b) fasteners for effecting said securements, whereby when said bracket has at least one end plate portion thereof secured to one end plate portion of said extension plate and the opposite end of said extension plate is in turn secured to the front surface of a construction stud and said fasteners are installed to perfect the securement and an electrical switch box is positioned within said rectangular opening and said bendable tabs are bent over said screw ear fasteners to perfect the securement thereof, said stabilizing rectangular plate extension tends to stiffen said bracket and said stiffening arm tends to stiffen said extension plate.

13. An electrical switch box mounting assembly adapted for dry wall construction for a switch box with adjustable screw ear fasteners with central openings and fixed threaded tabs on the end walls thereof, comprising:

(a) a mounting bracket formed from a single unitary section of stiff sheet metal material including:

(i) a flat plate body portion having at least one substantially rectangular opening defined by inwardly located opposed straight parallel upper and lower edges and opposed straight parallel right and left side edges located inwardly of said flat plate body portion and right-angled corner edges formed in said flat plate body portion around said rectangular opening, said rectangular opening being sized to register with and loosely receive a switch box with its screw ear fasteners resting on mating portions of said flat plate body portion;

(ii) at least one outwardly extending bendable tab formed out of said sheet material comprising and located on at least one of opposite edges of said flat plate body portion opening, each said bendable tab extending outwardly perpendicular to the plane of said flat plate body portion opening and being adapted to be received by a respective central opening of a respective said screw ear fastener and to be bent over said screw ear fastener parallel to and clear of a respective threaded tab of said switch box to secure said switch box to said bracket;

(iii) at least one right angular stabilizing rectangular plate extension formed from sheet material removed to establish said rectangular opening and extending outwardly therefrom with an outermost edge of said plate extension being adapted to engage an opposing wall surface during use; and (iv) plural spaced bracket mounting openings formed through at least one end plate portion forming an extension of said flat plate body portion enabling said mounting bracket to be attached to a wall stud by means of fasteners placed through said bracket mounting openings.

14. An electrical switch box mounting assembly as claimed in claim 13 wherein said flat plate and end plate portions reside in offset parallel planes separated by at least one defined offset formed in said bracket between said flat plate and end plate portions, the depth of said offset being substantially equal to the thickness of said screw ear fastener.

15. An electrical switch box mounting assembly as claimed in claim 13 including at least one right angular stabilizing rectangular plate extension formed from sheet material removed to establish said rectangular opening and extending outwardly therefrom, said plate extension terminating with at least one section of reduced width forming at least one leg portion having an outermost edge adapted to engage an opposing wall surface during use and being bendable enabling the size of said plate extension to be reduced.

16. An electrical switch box mounting assembly as claimed in claim 13 including:
(a) at least one rectangular extension plate formed of a single piece of flat stiff sheet metal material with a stiffening arm on at least one side of said end plate portion in right angular relation and sufficiently wide to substantially equal the width of the interior space of a wall on which said bracket is installed and having a plurality of sets of pairs of holes spaced lengthwise thereof and adapted for receiving fasteners to secure one end of said plate portion to the front surface of a stud utilizing one selected pair of said holes to establish the distance by which said bracket is offset from said stud and to secure an opposite end of said plate to said bracket end plate portion utilizing another selected pair of said holes in said extension plate mating a pair of holes in said bracket end plate portion; and
(b) fasteners for effecting said securements, whereby when said bracket has at least one end plate portion thereof secured to one end plate portion of said extension plate and the opposite end of said extension plate is in turn secured to the front surface of a construction stud and said fasteners are installed to perfect the securement and an electrical switch box is positioned within said rectangular opening and said bendable tabs are bent over said screw ear fasteners to perfect the securement thereof, said stabilizing rectangular plate extension tends to stiffen said bracket and said stiffening arm tends to stiffen said extension plate.

17. An electrical switch box mounting assembly adapted for dry wall construction for a switch box with adjustable screw ear fasteners with central openings and fixed threaded tabs on the end walls thereof, comprising:
(a) a mounting bracket formed from a single unitary section of stiff sheet metal material including:
(i) a flat plate body portion having an opening defined by edges formed in said flat plate body portion around said opening, said opening being sized to register with and loosely receive a switch box with its screw ear fasteners resting on mating portions of said flat plate body portion;
(ii) securing means on said flat plate body portion mating and adapted to be received by said screw ear fasteners clear of said threaded tabs to secure said screw ear fasteners to said flat plate body portion and in turn secure said switch box to said bracket;
(iii) at least one right angular stabilizing rectangular plate extension extending outwardly from said flat plate body portion with an outermost edge of said plate extension being adapted to engage an opposing wall surface during use; and
(iv) plural spaced bracket mounting openings formed through at least one end plate portion forming an extension of said flat plate body portion enabling said mounting bracket to be attached to a wall stud by means of fasteners placed through said bracket mounting openings.

18. An electrical switch box mounting assembly as claimed in claim 17, wherein:
(a) said opening is substantially rectangular and is defined by inwardly located opposed upper and lower edges and opposed right and left edges; and
(b) said securing means comprise screw fasteners securing said screw ear fasteners to said flat plate body portion.

19. An electrical switch box mounting assembly as claimed in claim 17 wherein:
said securing means comprises a pair of bendable tabs extending outwardly perpendicular to the plane of said flat plate body portion and located on opposite edges of said opening, each said tab being adapted to be received by a respective said central opening of a respective said screw ear.

20. An electrical switch box mounting assembly as claimed in claim 17 wherein:
said end plate portion comprises a pair of spaced apart end plate portions forming separate extensions of opposite sides of said flat body portion and defining said opening therebetween, said spaced apart end plate portions having at least one said bracket mounting opening.

* * * * *

UNITED STATES PATENT AND TRADEMARK OFFICE
CERTIFICATE OF CORRECTION

PATENT NO. : 4,753,361
DATED : June 28, 1988
INVENTOR(S) : Lewis B. Medlin, Jr.

It is certified that error appears in the above-identified patent and that said Letters Patent is hereby corrected as shown below:

Column 9, line 34, correct "was" to read --wall--.

Column 10, line 19, correct "plate" to read --plane--.

Column 10, line 36, cancel "tangular".

Column 13, lines 36-38, cancel "enabling said mounting bracket to be attached to a wall stud by means of fasteners placed through said bracket mounting openings."

Column 13, line 52, correct "as" to read --to--.

Signed and Sealed this

Eighth Day of November, 1988

Attest:

DONALD J. QUIGG

*Attesting Officer*  Commissioner of Patents and Trademarks